(12) United States Patent
Porter et al.

(10) Patent No.: US 7,870,613 B2
(45) Date of Patent: Jan. 11, 2011

(54) AUTOMATING SOFTWARE SECURITY RESTRICTIONS ON APPLICATIONS

(75) Inventors: Wayne Porter, Kirtland, OH (US); Chris Criswell, Proctorville, OH (US); Jan Hertsens, Barboursville, WV (US); Robert Egan, Marietta, GA (US)

(73) Assignee: FaceTime Communications, Inc., Belmont, CA (US)

( * ) Notice: Subject to any disclaimer, the term of this patent is extended or adjusted under 35 U.S.C. 154(b) by 966 days.

(21) Appl. No.: 11/368,029

(22) Filed: Mar. 2, 2006

(65) Prior Publication Data

US 2007/0261051 A1 Nov. 8, 2007

Related U.S. Application Data

(60) Provisional application No. 60/657,962, filed on Mar. 2, 2005, provisional application No. 60/657,985, filed on Mar. 2, 2005.

(51) Int. Cl.
G06F 11/00 (2006.01)
(52) U.S. Cl. .......................................... 726/25; 726/22
(58) Field of Classification Search ...................... 726/2, 726/22, 27, 30
See application file for complete search history.

(56) References Cited

U.S. PATENT DOCUMENTS

| | | | |
|---|---|---|---|
| 6,272,641 B1 | 8/2001 | Ji | |
| 6,505,300 B2 | 1/2003 | Chan et al. | |
| 6,711,686 B1* | 3/2004 | Barrett | 709/221 |
| 7,379,984 B1 | 5/2008 | Green | |
| 7,383,569 B1 | 6/2008 | Elgressy et al. | |
| 2002/0099952 A1* | 7/2002 | Lambert et al. | 713/200 |
| 2004/0255167 A1 | 12/2004 | Knight | |
| 2005/0021980 A1* | 1/2005 | Kanai | 713/182 |
| 2005/0166198 A1 | 7/2005 | Gigliotti et al. | |
| 2005/0188419 A1 | 8/2005 | Dadhia et al. | |
| 2005/0278785 A1 | 12/2005 | Lieberman | |
| 2006/0101522 A1 | 5/2006 | Rothwell et al. | |
| 2006/0179484 A1* | 8/2006 | Scrimsher et al. | 726/23 |
| 2006/0195899 A1 | 8/2006 | Ben-Shachar et al. | |
| 2007/0180490 A1* | 8/2007 | Renzi et al. | 726/1 |
| 2007/0261124 A1 | 11/2007 | Centonze et al. | |
| 2008/0109912 A1 | 5/2008 | Rivera | |

* cited by examiner

Primary Examiner—Kambiz Zand
Assistant Examiner—Amare Tabor
(74) Attorney, Agent, or Firm—Townsend and Townsend and Crew LLP

(57) ABSTRACT

Security components of managed computers are configured using inoculation data. Inoculation data can be retrieved from an inoculation data provider. The inoculation data provider analyzes unauthorized software applications to develop inoculation data. The inoculation data configures the security component to block execution of unauthorized software applications. Inoculation data can be embedded into a script, which is distributed via a management protocol to one or more managed computers from a management computer. Unauthorized software applications can be identified by filenames, storage paths, registry keys, digital signatures, download locations, residuals, and ActiveX controls or classes.

24 Claims, 12 Drawing Sheets

```
          ┌ [Uni]
  630 ─┤   Unicode=Yes                    ─── 610
          │  [Version]
          └ Signature=$CHICAGO$
  640 ┌ [HKLM\Software\Policies\Microsoft\Windows\Safer\0\\
       │    \Paths\02C7E642-7E04-11D0-9D99-00AC908DB96]
       └ "ItemData"=hex(2):"FOOBAR.EXE"
          ┌ [HKLM\Software\Policies\Microsoft\Windows\Safer\0\\
          │    \Hashes\02C7E642-7E04-11D0-9D99-00AC94B7812]"
  650 ─┤  "HashAlg"=dword:0x8003
          │  "ItemData"=hex:BB345238....          ─── 620
          └ "ItemSize"=hex(b):0x00010A00
          ┌ [HKLM\Software\Policies\Microsoft\Windows\Safer\0\\
  660 │    \Hashes\02C7E642-7E04-11D0-9D99-00AC94B7812]"
       │  "CertType"=dword:0x8003
       │  "ItemData"=hex:FAC30F1....
       └ "ItemSize"=hex(f):0x08610A00
```

FIG. 6

AUTOMATING SOFTWARE SECURITY RESTRICTIONS ON APPLICATIONS

CROSS REFERENCES TO RELATED APPLICATIONS

This application claims priority to U.S. Provisional Patent Application Nos. 60/657,962, filed Mar. 2, 2005 and 60/657,985, filed Mar. 2, 2005, both of which are incorporated by reference herein for all purposes. Additionally, this application is related to commonly owned co-pending U.S. patent application No. 11/368,025, filed Mar. 2, 2006, which is incorporated by reference herein for all purposes.

BACKGROUND OF THE INVENTION

The present invention relates to the field of computer security, and more particularly, to protecting computers against the installation or execution of unauthorized software. Unauthorized software applications can include self-propagating software applications, such as computer viruses, trojans, and worms; software intended to commercially exploit users, such as spyware or adware; malicious software or malware; surveillance applications such keyloggers, screen capturing programs, and web tracking programs; and software intended to conceal its own existence and/or the existence of other applications, such as rootkits; as well as any other type of software application, script, macro, or other executable instructions intended to operate on a computer system without the permission of the computer user and/or a system administrator.

One approach to protecting against the execution of unauthorized or malicious software on a computer is to scan the computer periodically for the presence of such software, in memory and on disk. If unauthorized software is found, the software can be removed. There are several problems with this approach. Performing the scan can take a significant amount of system resources (e.g., CPU cycles, disk accesses), even when done in the background. This leads some users to avoid the procedure. Yet to have maximum effect, the scan should be performed frequently. Furthermore, the scan only detects unauthorized software that is already present on the computer. Therefore, unauthorized software may have already caused inconvenience or damage by the time it is detected and removed.

A different approach is to prevent unauthorized software from installing on the computer in the first place. This approach uses security features provided by the operating system. A system administrator can create and deploy software restrictions that prevent unauthorized software from installing, executing, or accessing computer resources.

Existing solutions using this approach require system administrators to gather information about unauthorized software, and to use this information to create software restrictions that protect against the software. Previously, the process used to create and update software restrictions requires the system administrators to manually input information about the unauthorized software. This manual process is inefficient and time-consuming. In some cases, the system administrator must actually have a copy of the software application to create an effective software restriction -that blocks this software application. Thus, system administrators are often reacting to unauthorized software applications (and repairing the damage wrought by these applications), rather than preventing them from being executed in the first place. Moreover, the creators of unauthorized software may change these software applications frequently to produce many variants to bypass detection and previous software restrictions. As a result, existing approaches require system administrators to be constantly creating and updating software restrictions to protect against each variant.

It is therefore desirable for a system and method to automatically generate inoculation data to implement software restrictions that prevent authorized software applications from executing and/or accessing system resources. It is further desirable that the system and method to readily deploy inoculation data to managed computer systems to facilitate software restrictions in response to new or frequently changed unauthorized software applications. It is further desirable that the system and method disable countermeasures and defensive mechanisms of unauthorized software applications to facilitate their removal. It is also desirable for the system and method to implement preventative software restrictions against unauthorized software applications prior to any appearance of the applications on any managed computers.

BRIEF SUMMARY OF THE INVENTION

Security components of managed computers are configured using inoculation data. Inoculation data can be retrieved from an inoculation data provider. The inoculation data provider analyzes unauthorized software applications to develop inoculation data. The inoculation data configures the security component to block execution of unauthorized software applications. Inoculation data can be embedded into a script, which is distributed via a management protocol to one or more managed computers from a management computer. Unauthorized software applications can be identified by filenames, storage paths, registry keys, digital signatures, download locations, residuals, and ActiveX controls or classes.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention.

FIG. 6 is a block diagram illustrating the format of the script 170 from FIG. 1

DETAILED DESCRIPTION OF THE INVENTION

Security components, which include access control components and other defensive mechanisms of computer systems and their operating systems, protect against unauthorized software applications. Security components may be built into an operating system and/or may be an application separate from the operating system. Security components typically must be configured to identify and protect against specific unauthorized software applications. Inoculation data is data used to configure one or more security components to protect against unauthorized software applications. The set of inoculation data configuring security components to protect against unauthorized software applications are referred to collectively as software restrictions.

An embodiment of the invention automatically generates inoculation data to prevent unauthorized software applications from executing and from accessing system resources, such as memory; disk storage; processor threads; operating system and program services; configuration databases and files, such as the Windows registry; dynamic link libraries (DLLs) and equivalents; paths, .ZIP, .JAR, .CAB, and other types of archives; browser cookies; ActiveX classes, and processor priority. An embodiment of the invention further enables the deployment and installation of inoculation data on one or more managed computer systems. Scripts facilitate the configuration of security components with inoculation data implementing one or more software restrictions.

Figure 1:
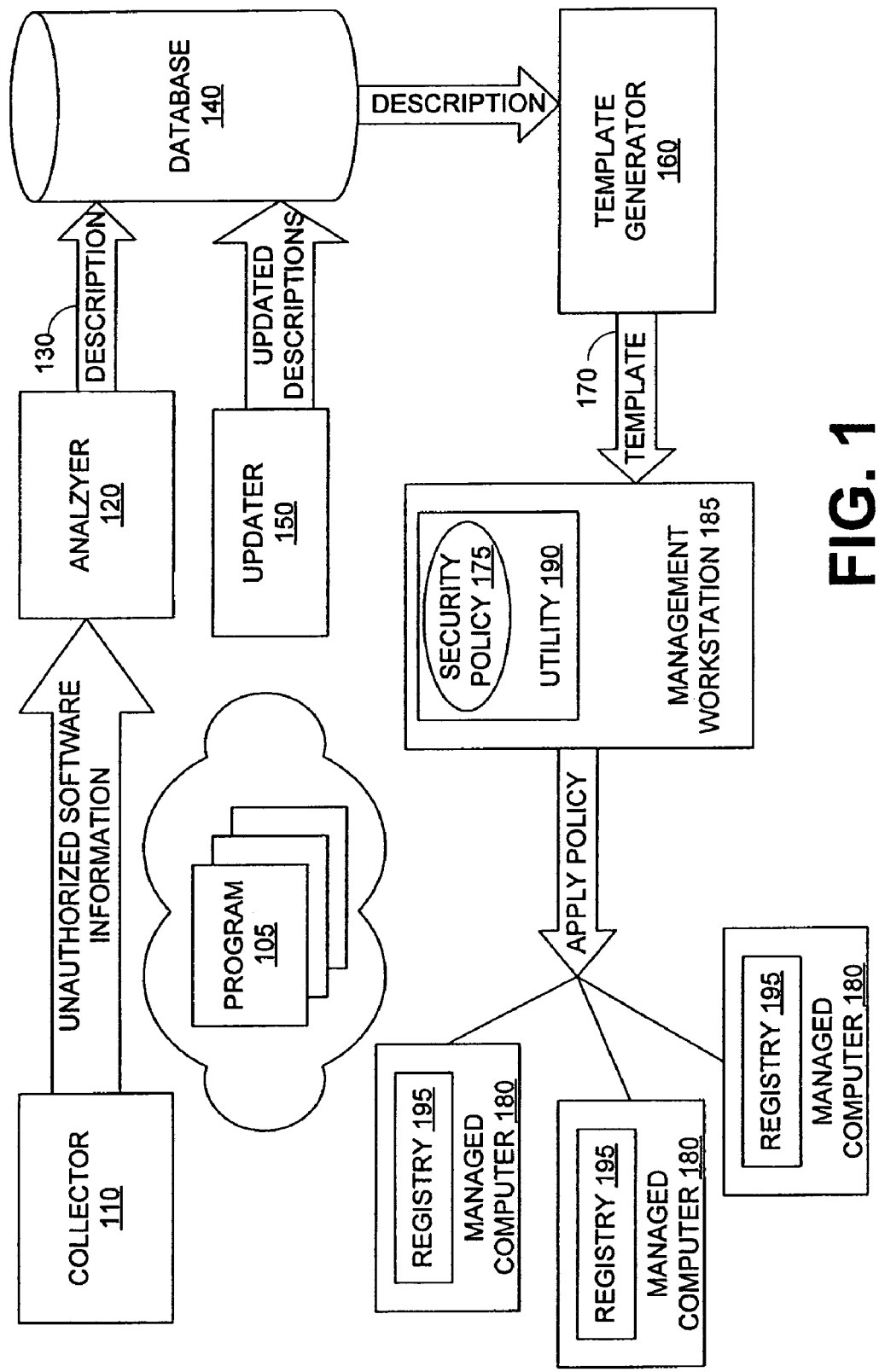
FIG. 1 is a block diagram illustrating the environment of the method for automating the creation of script including inoculation data.

FIG. 1 is a block diagram of an environment in which the method for automating the creation of scripts including inoculation data can be implemented. A data collector software component 110 collects information about unauthorized software programs 105 such as viruses, adware, spyware, and other unwanted programs. The raw information is provided to an analyzer 120, which analyzes the information to characterize and describe each unauthorized software program 105. Descriptions 130 of unauthorized software are stored in a database 140. An update software component 150 uses these descriptions 130 to search the Internet for mutations or variations of already-known software, and to update the database 140 with information about discovered variants.

In an embodiment, data collector software component 110 is an automated reporting system, analyzer 120 is includes applications and/or trained users, and the update software component 150 is a web-crawler (also known as a spider or a bot). The reporting system receives submissions about suspected or known viruses, adware, spyware, etc. The analyzers review submissions and determine if information collected about a particular software program 105 is enough to characterize it and to include it in the database 140. In another embodiment, the analyzer 120 is a software component.

Data collector software component 110 can include system monitoring and reporting applications operating on numerous computer systems. Data collector software component 110 can be built into other anti-spyware, anti-virus, firewall, or other security applications to facilitate gathering information on new unauthorized software applications. Data collector software component 110 can also be installed on honeypot computer systems, which are systems that are configured to be deliberately exposed to unauthorized software applications to gather information about new unauthorized software applications.

A further embodiment of the data collector software component 110 can use data extracted from unauthorized software applications with publicly available or private Internet search engines to search for web sites and other network locations hosting the unauthorized software application. These web sites and network locations can be analyzed to identify distribution methods of unauthorized software applications, such as ActiveX controls, as well as potential new unauthorized software applications. Similarly, instant messaging networks, peer-to-peer networks, and other types of overlay and "gray" networks can be monitored for suspicious data payloads.

The description 130 of unauthorized software stored in database 140 includes one or more of the items listed in Table 1. Some of the items describe an unauthorized software program 105 in terms of what it is. That is, these items identify characteristics of the software itself. Some of the items describe the software in terms of what it does when it installs and/or executes on a computer.

TABLE 1

| Item | Description |
| --- | --- |
| Filename | name of the file containing the unauthorized software, or a file used b the software |
| Network Location | software is downloaded from this address |
| Signature | uniquely identifies contents of the file, e.g., hash, checksum |
| Certificate | the creator/publisher of the software "signs" the software to certify its trustworthiness |
| Directory Location | unauthorized software executes from this location |
| Registry Key | this registry key points to the directory from which unauthorized software executes |

A script generator 160 extracts the software descriptions 130 from the database 140 to automatically create a script including inoculation data 170. The script 170 is a file which describes a software restriction 175. When applied to one or more managed computers 180, software restriction 175 prevents those computers executing the unauthorized software 105 described by the descriptions 130. (Software restrictions will be discussed in more detail in connection with FIG. 2.)

Advantageously the generator 160 produces the script 170 in a format that is directly usable by a management workstation 185. Generating a script including inoculation data thus involves translating, or mapping, the descriptions 130 into a software restriction using this format. The script format will be described in more detail in connection with FIG. 6. The translation procedure will be described in more detail in connection with FIG. 9.

Once created, the software restriction 175 in the script 170 is applied to one or more managed computers 180 by a system administrator using a management workstation 185. In an embodiment, the workstation 185 and the managed computers 180 use a version of the Microsoft Windows® as an operating system, and also use Microsoft ActiveDirectory® as a directory service to manage network resources.

The script 170 is downloaded or copied to the workstation 185. Using a registry utility 190 on workstation 185, a system administrator applies the software restriction 175 contained in script 170 to a registry 195 of one or more managed computers 180. The registry 195 is a configuration database that stores many types of computer-specific and user-specific data associated with a particular managed computer 180. In one embodiment, utility 190 is the Microsoft REGEDIT program. In another embodiment, the utility 190 is the Microsoft SECEDIT program, a utility that allows an administrator to import and apply the script 170 through command-line arguments or a script rather than through user interaction. The software restriction 175 can be applied to the registry 195 of one managed computer, any subset of managed computers 180, or all of managed computers 180.

Using a script 170 to apply the software restriction 175 greatly simplifies the process of hardening one or more managed computers 180 against unauthorized software. A script 170 contains a description of a particular software restriction 175. Therefore, instead of manually entering all the description data (which may contain multiple unauthorized programs 105) into the registry 195, the system administrator simply applies the software restriction 175 in script 170, using the registry utility 190.

Figure 2:
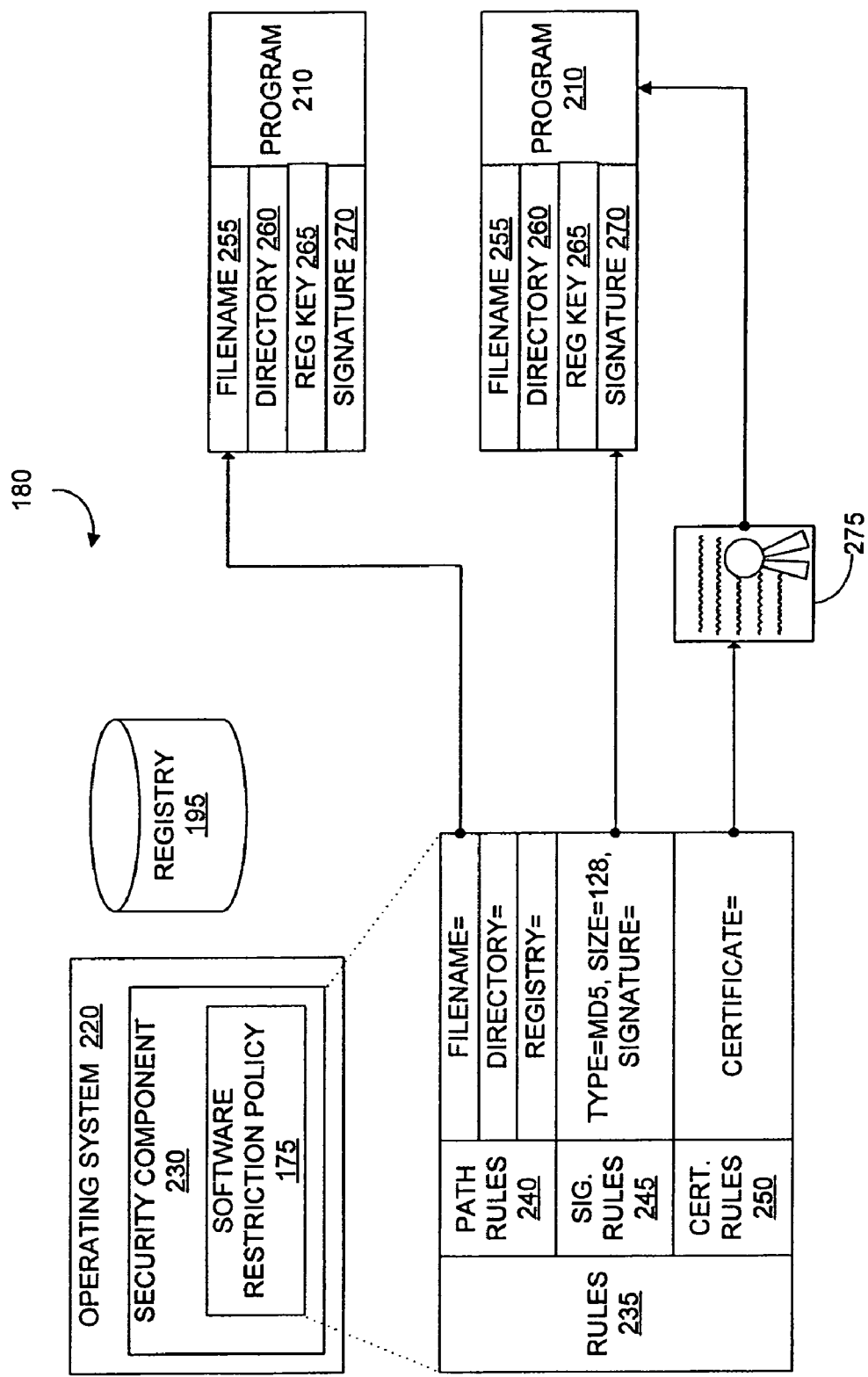
FIG. 2 is a block diagram illustrating one embodiment of the managed target computer system of FIG. 1.

The software restriction 175 protects managed computer 180 against unauthorized software as follows. As shown in FIG. 2, the managed computer 180 contains one or more executable programs 210, such as programs 210a and 210b. One or more of the executable programs 210 may be considered unauthorized programs. The managed computer 180 also includes the registry 195, an operating system 220, and a security component 230. In an embodiment, the security component 230 can be included within the operating system 220. For example, the Group Policy Management Console component of the Microsoft Windows operating system includes objects, such as group policy objects, adapted to selectively block execution of programs. To implement software restrictions, group policy objects can be installed directly on managed computers or distributed from a management workstation to one or more managed computers via a data communications network, for example using the Microsoft Windows Active Directory replication feature, LDAP, or any other management protocol. Similar access control enforcement mechanisms are available for many other operating systems, such as Unix, Linux, AppleOS, and Solaris, to allow, block, or throttle, or otherwise control access to applications and system resources. System administrators can select all or a portion of the computer systems under their control to receive and install the inoculation data, thereby implementing the software restrictions.

The security component 230 controls the execution of executable programs 210 based on rules 235 contained in the software restriction 175. In embodiments of the invention, the rules 235 may be stored in the registry 195, any other type of store of system configuration information, as part of the security component 230, and/or in a separate file or data structure stored by the managed computer 180; a management workstation 185, discussed above; or by any other data storage resource connected with the managed computer 180 via a data communications network. In an embodiment, each of the rules 235 identifies one or more of the executable programs 210.

When a user or any application or process attempts to execute any of the executable programs 210, the operating system 220 invokes the security component 230. The security component 230 examines the software restriction 175. If one or more of the rules 235 match characteristics of the invoked executable program, then an embodiment of the security component 230 prevents the invoked program from executing. In a further embodiment, the security component and software restriction policies can be written to only allow programs matching one or more of the rules 235 to execute.

Executable programs 210 include conventional executable files with the extensions .EXE and .COM, as well as many other types of files which contain scripts or interpreted code. A non-limiting list of executable file types includes: Windows® scripts (WSH); Visual Basic scripts (VBS); application server pages (ASP); uniform resource locators (URL); registry entries (REG); batch files (CMD, BAT); desktop shortcuts (LNK); and help files (HLP, CHM).

Rules 235 can be classified into various types, including (but not limited to): a path rule 240; a signature rule 245; and a certificate rule 250. A path rule 240 identifies an executable program 210 by a name 255, a directory 260, or a registry key 265. A path rule 240 which uses a name 255 and/or path to identifies any executable program 210 having this name 255. A path rule 240 which uses a directory 260 identifies any executable program 210 executing from this directory 260. If the path rule 260 uses a registry key 265, the key 265 identifies a directory 260, and the rule identifies any executable program 210 executing from this directory 260.

A signature rule 245 identifies an executable program 210 through a unique digital signature 270, also called a "hash." This digital signature 270 is generated by performing a cryptographic algorithm on the contents of the file. Thus, different versions of a program with the same filename will have different digital signatures, because the program contents differ. Two commonly used types of digital signatures 270 are secure hash algorithm version 1 (SHA-1) and message digest version 5 (MD5). The signature rule 255 includes the binary signature 270, as well as the signature type and signature size (e.g., 128 bits for MD5, 160 bits for SHA-1).

A certificate rule 250 identifies an executable program 210 indirectly, by using a digital certificate 275 which identifies the publisher or provider of the executable program 210. Thus, a certificate rule 250 prevents execution of any program 210 published by the entity identified by the certificate 250. A software provider uses a certificate 275 to "digitally sign" an executable program 210, a process that is based on a cryptographic algorithms. A certificate 275 thus provides an authentication mechanism, allowing a user to verify the identity of the program provider and to verify that the contents of the program 210 have not been altered. X.509 is a well-known certificate standard.

In another embodiment of the method for automating the creation of script including inoculation data, a network location rule identifies any executable program 210 downloaded from a specified network location. In one embodiment, the network location is specified as an Internet Protocol (IP) address (e.g., 192.168.0.19) or as a URL (e.g., www.foo-.com). In another embodiment, the network location specifies a zone, where a zone is a list of network locations. In the embodiment using zones, network locations which are not trusted are grouped into a restricted zone, and a network location rule referring to the restricted zone prevents the execution of any software downloaded from one of the restricted locations.

Figure 3:
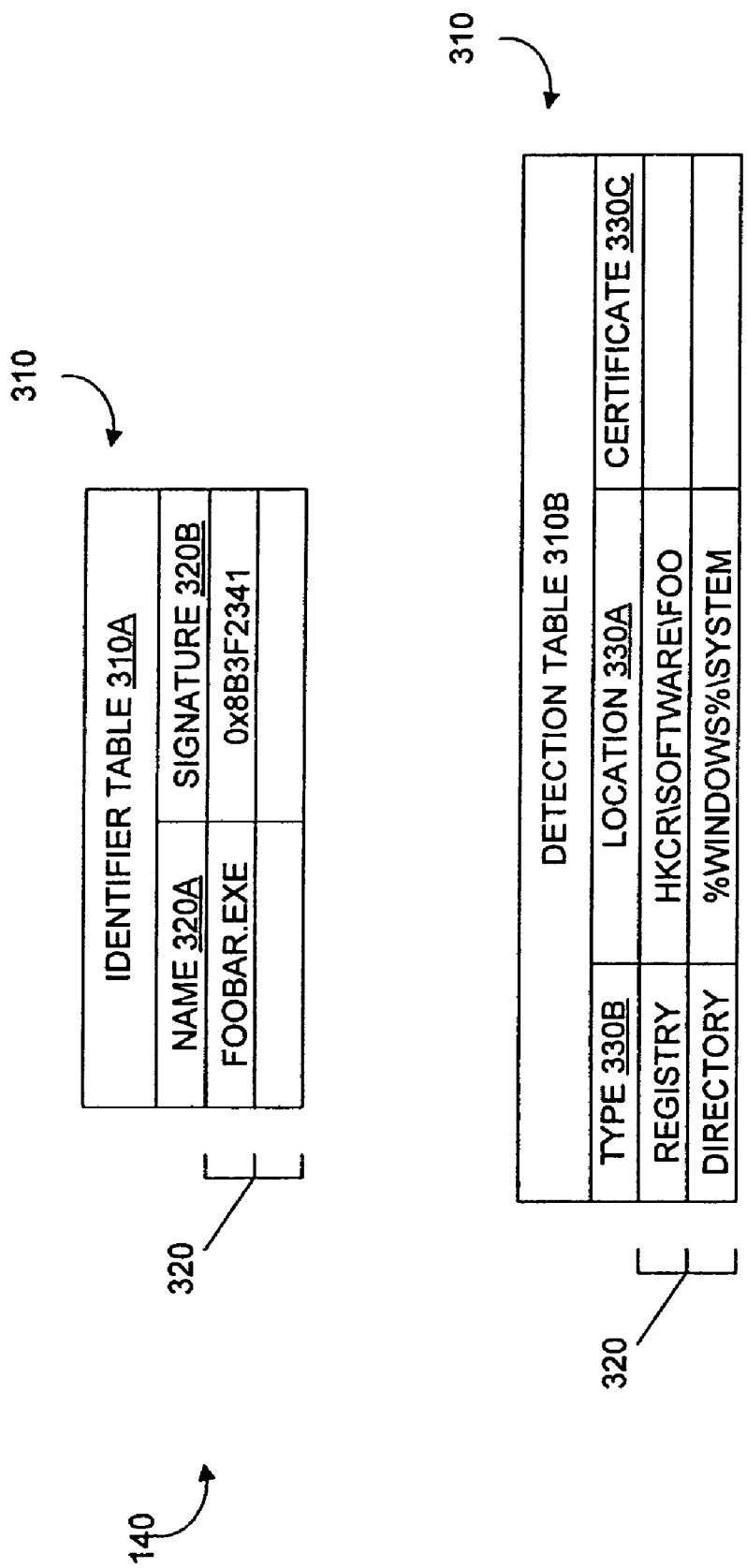
FIG. 3 is a block diagram illustrating one embodiment of the database 140 from FIG. 1

As discussed in connection with FIG. 1, an embodiment of the invention automatically creates scripts adapted to implement a software restriction 175. In an embodiment, unauthorized software 105 is characterized and a resulting description is stored in the database 140. FIG. 3 is a block diagram illustrating one embodiment of the database 140. The database 140 comprises one or more tables 310, with each table containing rows 320. Each row 320 represents a set of one or more attributes describing a particular unauthorized software program 105. A description 130 thus comprises one or more rows 320 of one or more tables.

In the embodiment of FIG. 3, the description 130 is split among multiple tables 310A and 310B. One table (310A) contains columns for those items, or attributes, that identify an unauthorized software program (i.e., what it is). This identifier table 310A contains a Name column 320A, and a Signature column 320B. The other table (310B) contains columns for those items that do not strictly identify the program, but can be used to detect it based on how it behaves during execution. This detection table 310B contains a Location column 330A and a Type column 330B. Location column 330A represents a location accessed by the unauthorized software program when it executes. The type of location depends on the value in Type column 330B, e.g., directory, registry. The detection table 310B also contains a Certificate column 330C.

Figure 4:
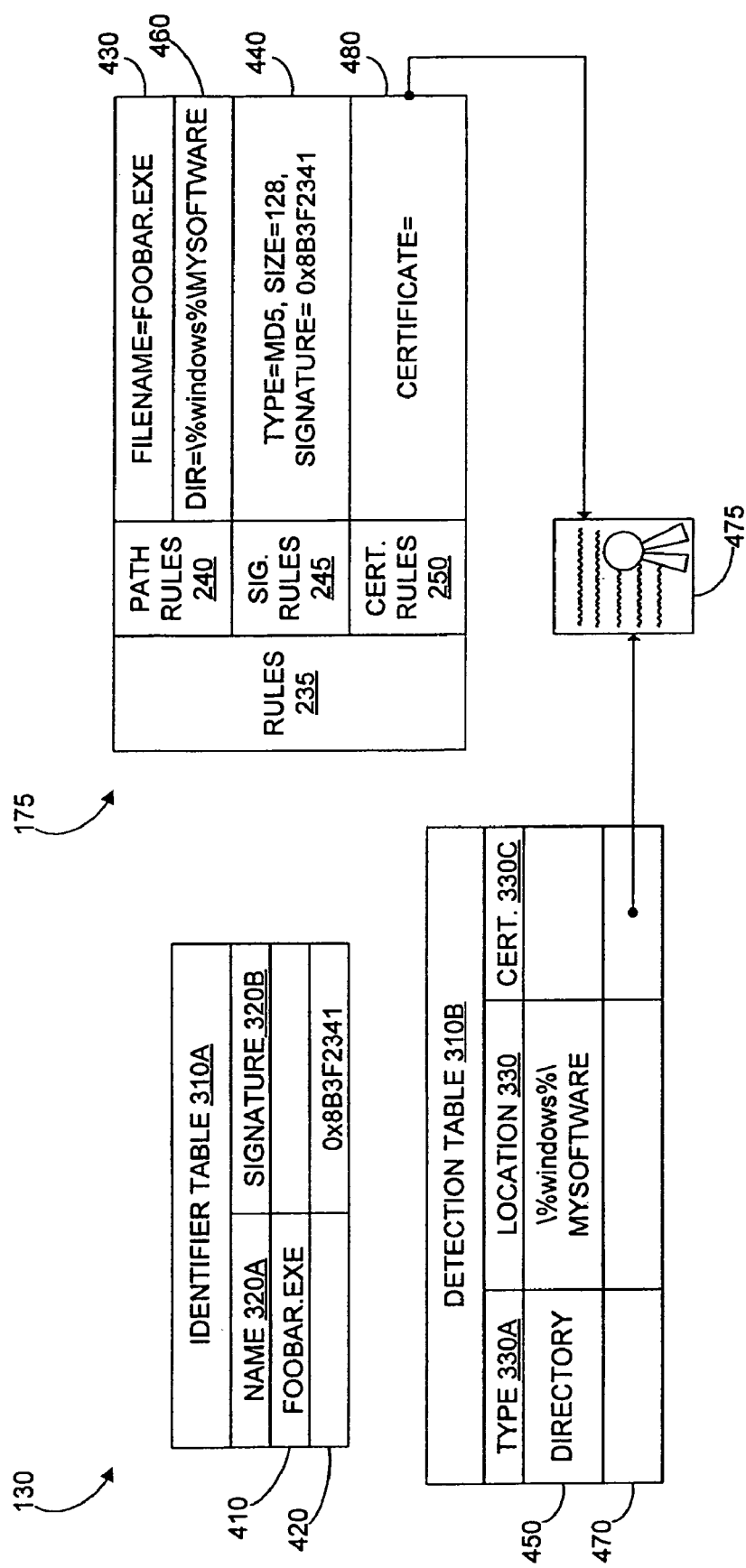
FIG. 4 is a block diagram illustrating the correspondence between the database 140 of FIG. 1 and the software restriction of FIG. 1.

FIG. 4 illustrates example descriptions 130 in the database 140 corresponding to rules 235 within a software restriction 175 according to an embodiment of the invention. Row 410, in the identifier table 310A, describes a program 210 which can be identified by the name "FOOBAR.EXE". Row 420, in the identifier table 310, describes another program 210 which can be identified by the signature Ox8B3F2341. This description corresponds to two rules which protect against these unauthorized programs. These two rules are: path rule 430, which denies execution of an executable program with the name "FOOBAR.EXE"; and signature rule 440, which denies execution of an executable program with the signature value of 0x8B3F2341.

Row 450, in the detection table 310B, describes a program which executes from the directory "\%WINDOWS%\MYSOFTWARE". This description corresponds to a path rule 460 which denies execution of programs in the "MYSOFTWARE" subdirectory of the Windows® installation directory (specified by the environment variable %WINDOWS%).

Finally, row 470, in the detection table 310B, describes a digital certificate 475 required to execute some programs. This description corresponds to a certificate rule 480. In this example, if an invoked program matches the certificate rule 480 included in software restriction rules, but does not provide the required digital certificate, the program is not executed. Conversely, if the invoked program provides a digital certificate matching the certificate 475 given by the rule 480, the program is executed.

Further types of rules can be stored in database 140 in a similar manner. The concepts of identifying a program by attributes such as a filename, path location, contents or a hash or signature thereof, registry keys or other configuration data, residuals, such as data left behind during installation, or any other characteristic are straightforward and embodiments of the database may include entries with data adapted to identify programs using these attribute. The concept of detecting installation of a program by actions on the registry will now be explained in more detail.

Figure 5:
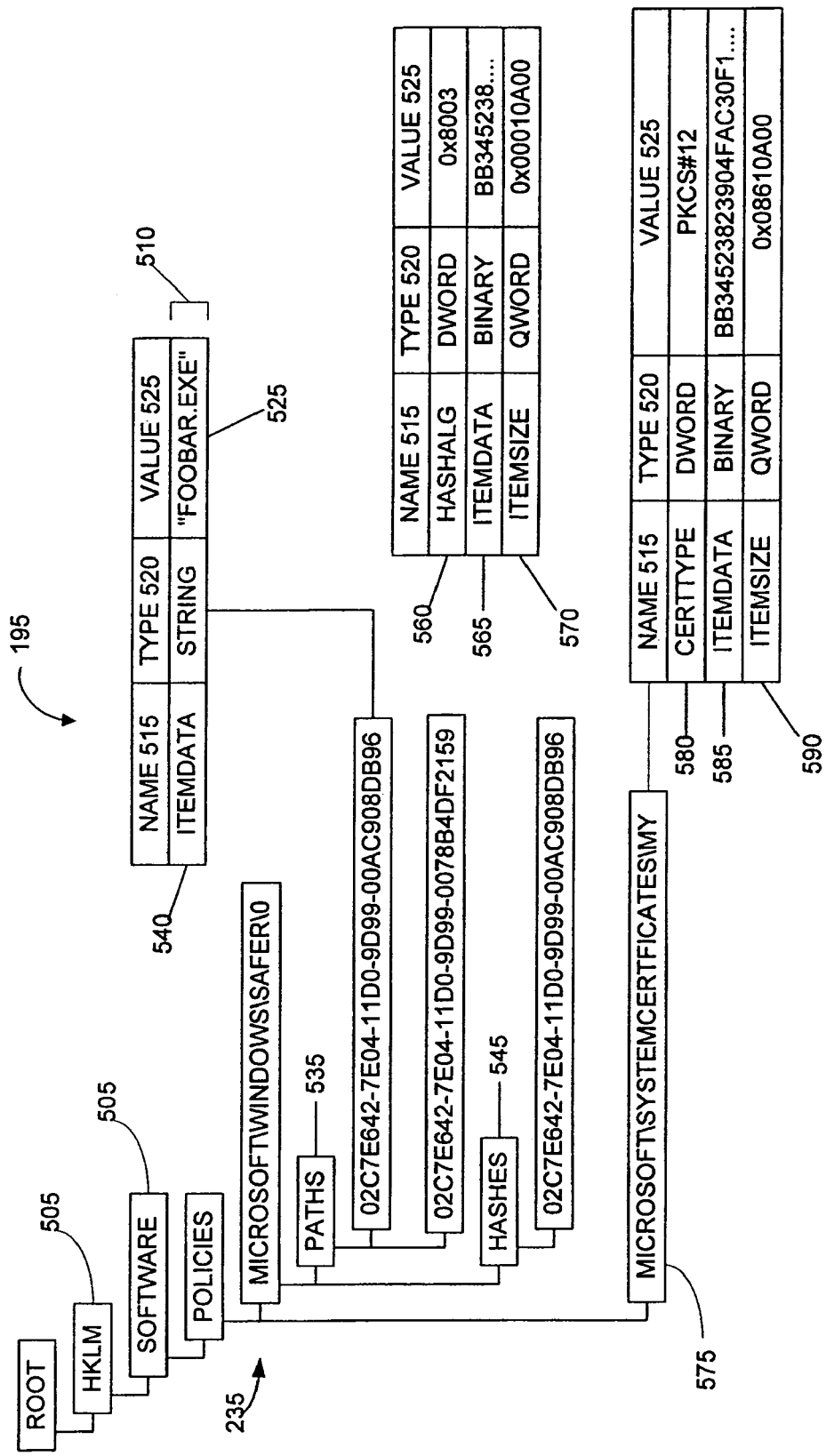
FIG. 5 is a block diagram illustrating a registry 195 of the managed target computer system of FIG. 1.

FIG. 5 is a block diagram illustrating the registry 195 of a managed computer 180. The registry 195 is an example of a configuration database stored on each managed computer 180. In an embodiment, the registry 195 stores software restriction rules 235. In this example application, the registry 195 is logically arranged in a tree-like hierarchy, and is populated with registry keys 505. Each key 505 can have value entries 510. Each value entry 510 has a name 515, a type 520, and a value 525. A particular value entry 510 is located under a particular key 505, and can be identified by a path from the root key to this key.

In this example, path rules 240 are stored under a sub-key 535 of the form "HKLM\Software\Policies\Microsoft\Windows\Safer\0\Paths\{GUID}", where GUID is a uniquely generated identifier which is specific to the path rule 240. (GUID generation is a well-known technique, and typically combines a system-specific identifier such as an Ethernet address with a current system time). The directory or filename identified in the rule is stored in a value entry 540 with a name 515 of "ItemData", of type String, and with a value 525 equal to the directory or filename. In the example of FIG. 5, the sub-key 535 corresponding to the path rule 240 prevents execution of a program 210 named "FOOBAR.EXE". In this example embodiment, directories are represented by a wildcard character ("*") in the string, and a string without a wildcard is interpreted as a filename.

In this example, a signature rule 245a has a sub-key 545 of the form "HKLM\Software\Policies\Microsoft\Windows\Safer\0\Hashes\{GUID}", where GUID is a uniquely generated identifier which is specific to the signature rule 245. Several value entries are stored underneath the signature sub-key 545. One value entry (560) specifies the type of signature (e.g., MD5 or SHA-1). Another value entry 565 specifies the signature itself, in binary form. Yet another value entry (570) specifies the size of the executable program 210. In the example of FIG. 5, the sub-key 545 corresponding to the signature rule 245 prevents execution of a program 210 having an MD5 signature of 0x0876FA3298760BB34523 823904FAC30F1.

In this example, certificate rules 250 are stored under the sub-key "HKLM\Software\Policies\Microsoft\System Certificates\My" (575). Several value entries are stored in the certificate sub-key 575. One value entry (580) specifies the certificate format (e.g., PKCS#12, PKCS#7, DER Encoded Binary X.509, Base64 Encoded X.509). Another value entry (585) specifies the certificate itself, in binary form. Yet another value entry (590) specifies the size of the binary certificate. As explained earlier in connection with FIG. 2, a certificate rule 250 prevents the execution of any program 210 that includes the specified certificate 275.

Further types of rules can be stored in the registry in a similar manner.

In an embodiment, software restriction 175 can be manually entered into the registry or other configuration database of the managed computer system. In a further embodiment, the utility of a software restriction 175 is improved by generating and saving the software restriction 175 as a script 170 that is directly usable by the registry utility 190.

FIG. 6 illustrates the format of an example script 170 embodying a software restriction 175 according to an embodiment of the invention. Example script 170 is in a format is supported by Windows® registry utilities 190, such as, but not limited to, REGEDIT. Additional embodiments of script 170 can be expressed in any other scripting language or format known in the art. In this example, script 170 is a text file, divided into headers 610 and entries 620. A header 610 is a string enclosed in brackets. An entry 620 is a string of comma-separated values. If the string spans more than one line, the lines are separated by two backslash characters ("\\") Each entry 620 is located below, and associated with, a header 610.

In one embodiment, the script 170 contains an introductory section 630 containing the headers 610 and entries 620 shown in Table 2. The entries in introductory section 630 identify and describe the script format. The $CHICAGO$ signature signifies a format that works with multiple versions of the Windows® operating system (Windows 95 and later).

TABLE 2

Introductory Section

[Unicode]
Unicode=Yes
[Version]
Signature="$CHICAGO$"
Revision=1
[Profile Description]
Description--Protecting a system against unauthorized software The remainder of the script 170 includes a header 610 for each registry key 505 to be added to the registry 195, and entries 620 underneath each header 610. As explained earlier in connection with FIG. 5, path rules 240 are stored as a separate registry keys 535 each with one or more value entries 510. Therefore, path rules 240 are represented in the script 170 by a path rule section (640) containing a header and one or more entries. Similarly, each signature rule 245 is represented in the script 170 by a section (650) containing a header and one or more entries, and each certificate rule 250 is represented by another section (660) containing a header and one or more entries. As can be seen in FIG. 6, the entries in the path rule section 640, signature rule section 650, and certificate rule section 660 correspond to the registry value entries 510 described earlier in connection with FIG. 5.

Figure 7:
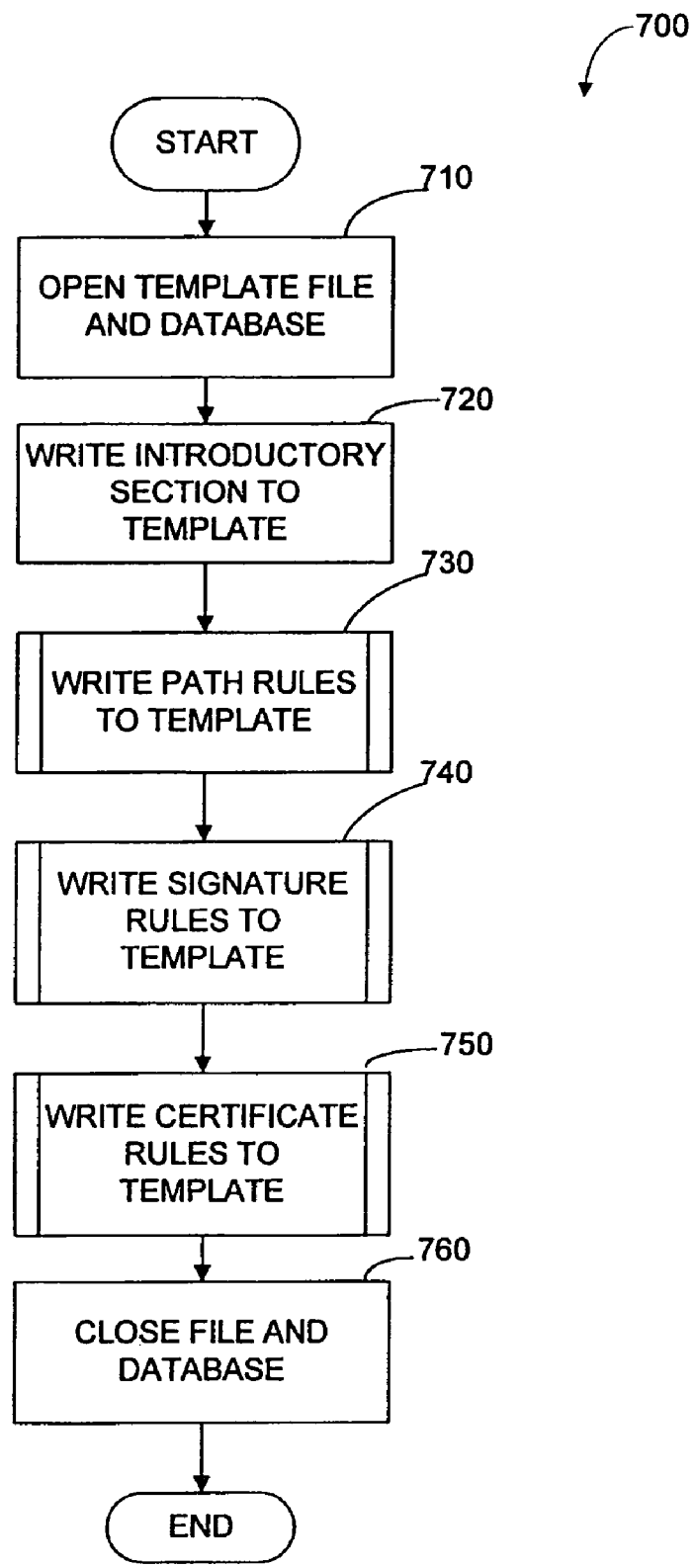
FIG. 7 is a flowchart diagram illustrating the translation process performed by the script generator 160 of FIG. 1

An embodiment of the script generator 160 uses this script format to generate one or more scripts adapted to be executed to implement software restriction policies. In an embodiment, the script generator 160 maps or translates the descriptions 130 stored in the database 140 into a script 170 having this format. FIG. 7 illustrates a translation method 700 according to an embodiment of the invention.

An embodiment of the translation method 700 begins at step 710, where the database 140 is opened and the script file 170 is opened. Next, at step 720, the generator 160 writes the introductory section 630 to the script file 170. At step 730, the generator 160 writes one or more path rules sections 640 to the script file 170. At step 740, the generator 160 writes one or more signature rules sections 650. At step 750, the generator 160 writes one or more certificate rules sections 660 to the script file 170. Finally, at step 760, the generator 160 closes the script file 170 and the database 140. Note that some or all of the sections of the script file 170 can appear in any order. Furthermore, method 700 can include additional steps similar to steps 730, 740, and 750 to write additional types of rules to the script file 170.

Figure 8A:
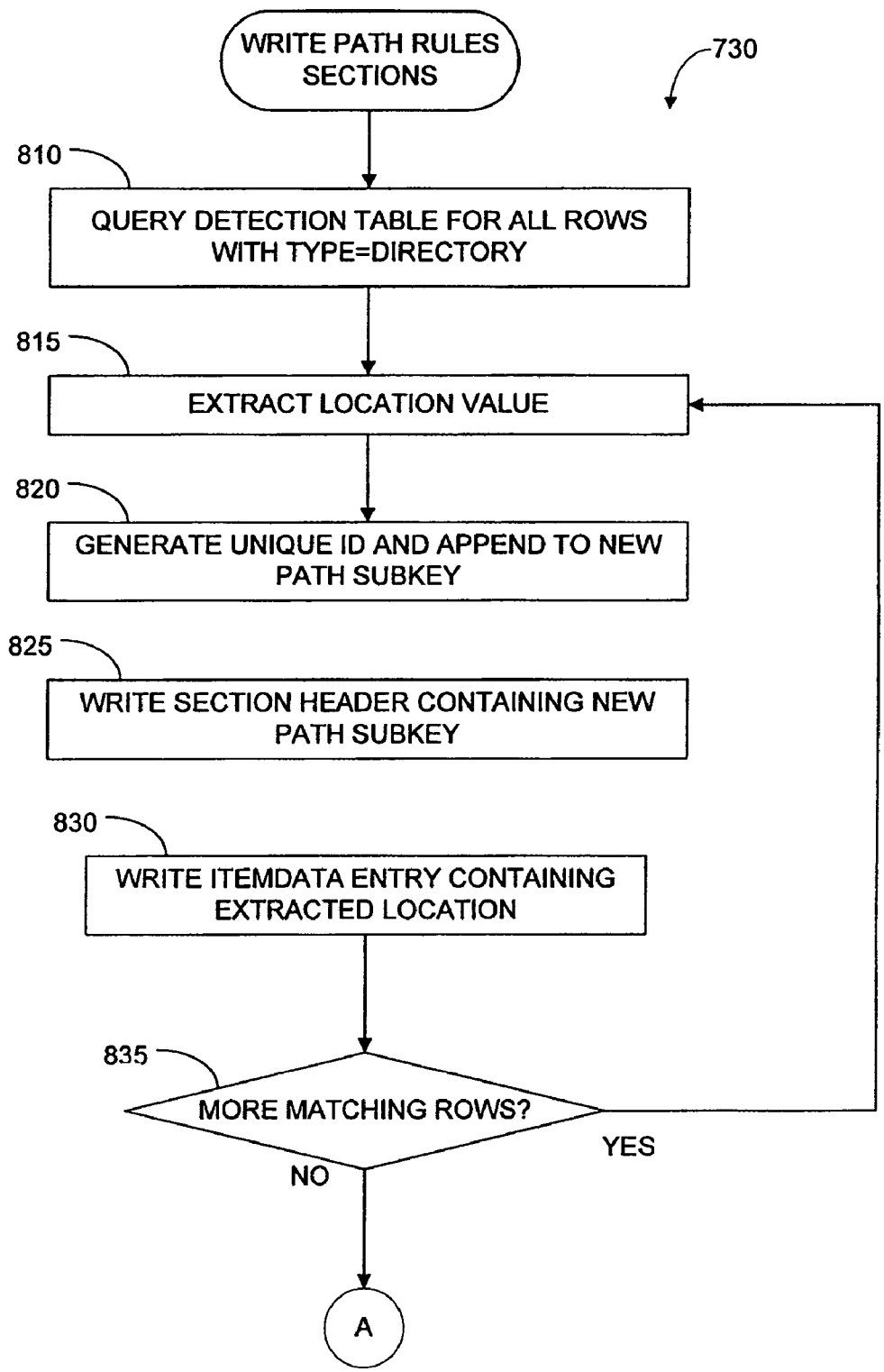
FIGS. 8A and 8B are a flowchart diagram of the WritePathRules subroutine 930 of FIG. 7.
Figure 8B:
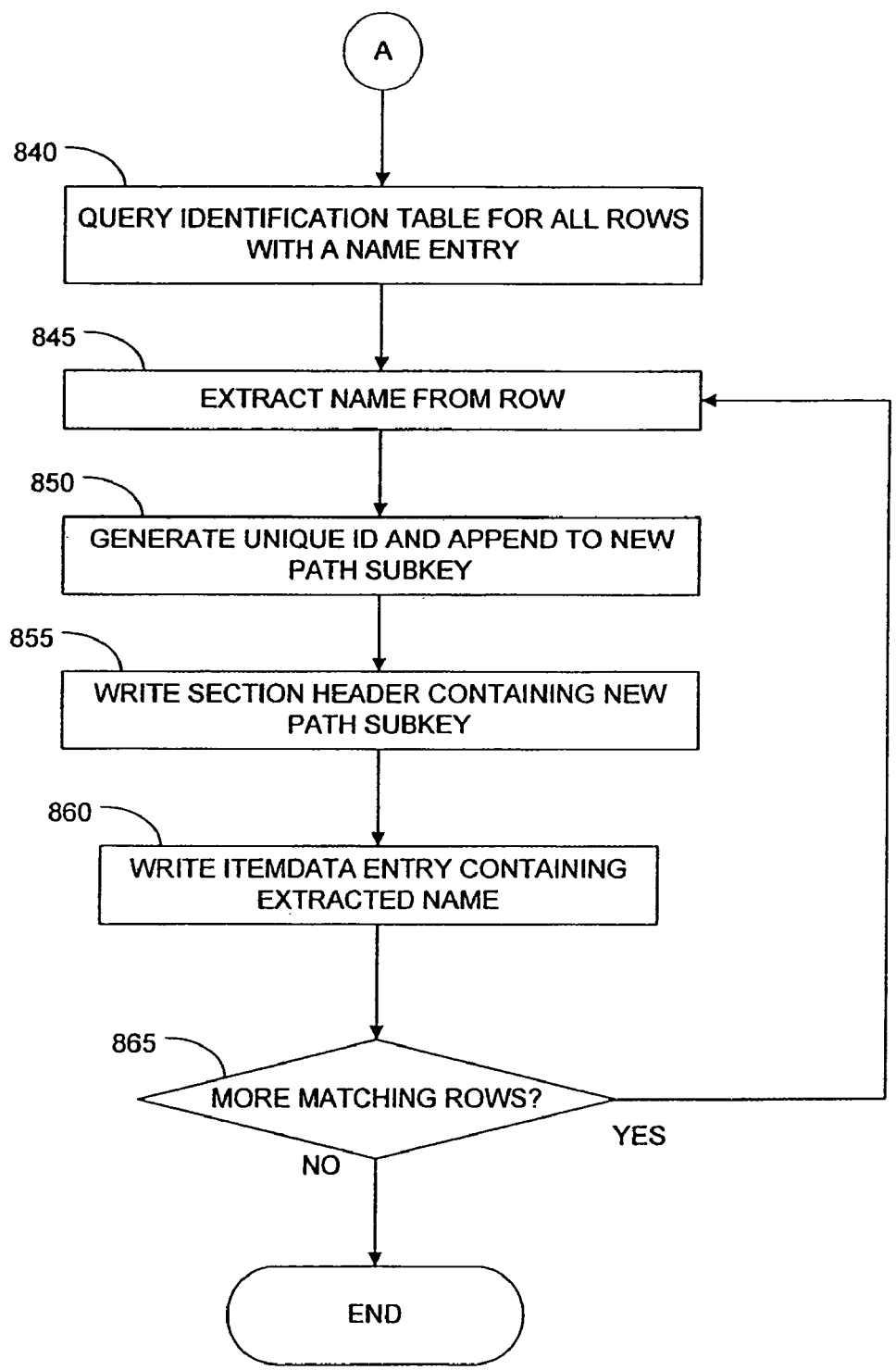
Figure 9:
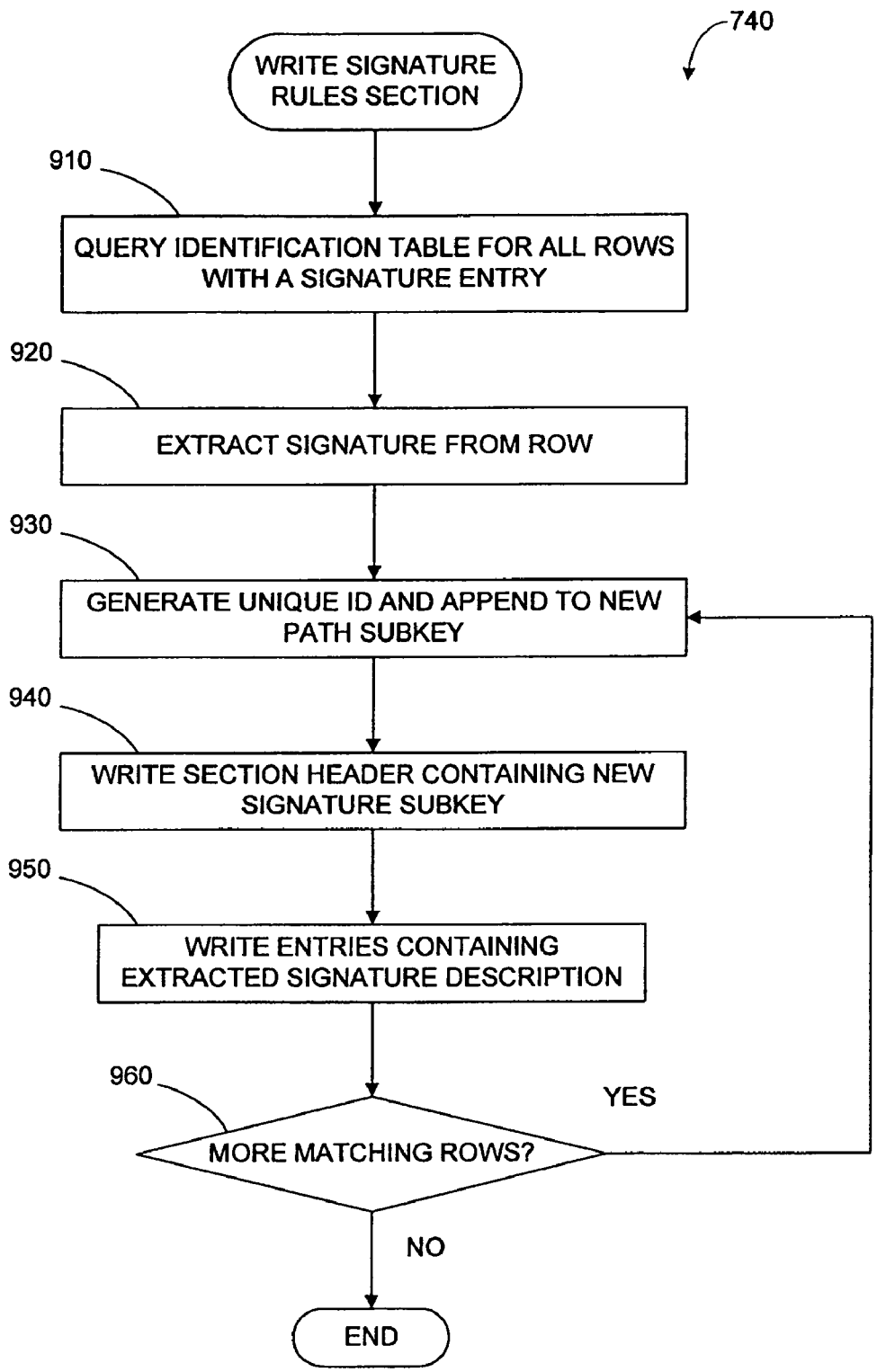
FIG. 9 is a flowchart diagram of the WriteSignatureRules subroutine 940 of FIG. 7.
Figure 10:
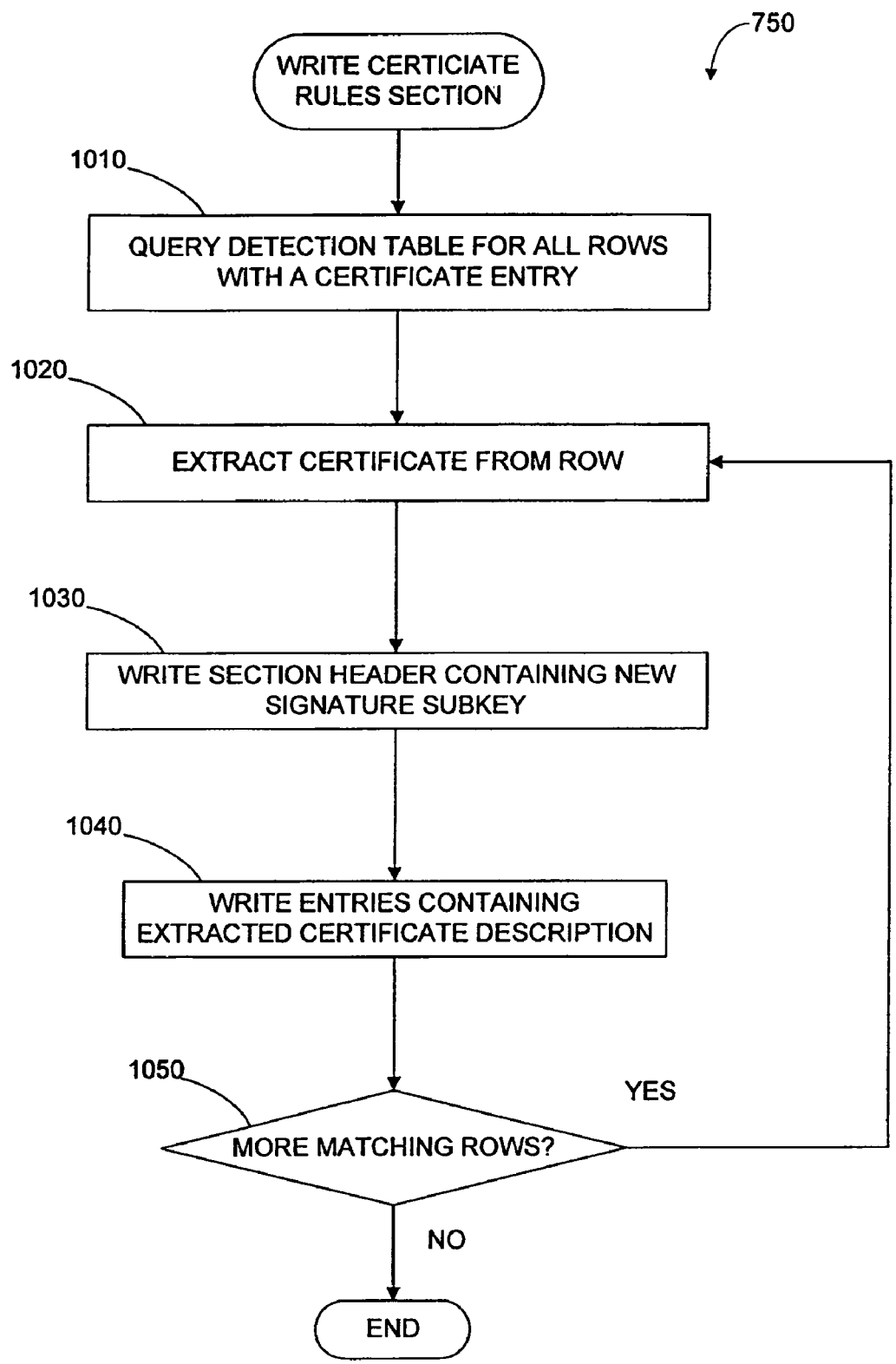
FIG. 10 is a flowchart diagram of the WriteCertificateRules subroutine 950 of FIG. 7.

The flowcharts in FIGS. 8-10 further illustrate more details of writing the various sections to script 170. FIGS. 8A-8B illustrate the process of writing path rules, shown in FIG. 7 as step 730. This process will add a section to the script file 170 for each path rule 240 found in the identification table 310A or in the detection table 310B. The new path rule section 640 will contain a header 610 that creates, in the registry 195, a path rule subkey 535 with a unique name. The unique name may be based on the path specified in the rule. The new path rule section 640 will also contain one or more entries 620 which create registry value entries 510 containing the filename or directory specified in the path rule 240.

Path rules 240 using directories are stored in the detection table 310B. The process begins in step 810, where the detection table 310B is queried to find all rows having a Type column 330B that indicates that location type is a Directory. In step 815, the location (directory) is extracted from the row. The path rule 240 will be stored in the registry 195 in a new sub-key under "HKLM\Software\Policies\Microsoft\Windows\Safer\0\Paths." Therefore, in step 820, a unique id is generated and is combined with this HKLM prefix to form the name of the new sub-key 535. In step 825, a section header 640 containing the name of this new sub-key is added to the script file 170. In step 830, a new entry is added to the script file 170, under the newly-added section header 640. This entry contains the directory name extracted from the matching row in the detection table 310B.

At step 835, the process determines whether or not more matching rows remain to be processed. If Yes, steps 815-830 are repeated until those rows returned by the query have been processed. If No, the path rules 240 using filenames will then be processed.

Path rules 240 using filenames are also stored in the identification table 310A. The process begins in step 840, where the identification table 310A is queried to find all rows having a Name column 320A. In step 845, the name is extracted from the row. The path rule 240 will be stored in the registry 195 in a new subkey under "HKLM\Software\Policies\Microsoft\Windows\Safer\0\Paths." Therefore, in step 850, a unique id is generated and is combined with this HKLM prefix to form the name of the new sub-key 535. In step 855, a section header 640 containing the name of this new sub-key 535 is added to the script file 170. In step 860, a new entry is then added to the script file 170, under the newly-added section header 640. This entry contains the filename extracted from the matching row in the identification table 310A.

At step 865, the process determines whether or not more matching rows remain to be processed. If Yes, steps 845-860 are repeated until rows returned by the query have been processed. If No, the process terminates.

FIG. 9 illustrates the process of writing signature rules, shown in FIG. 7 as step 740. This process will add a section to the script file 170 for each signature rule 245 found in the identification table 310A. The new signature rule section 650 will contain a header 610 that creates, in the registry 195, a signature rule sub-key 545 with a unique name. The unique name may be based on the signature in the rule. The new signature rule section 650 will also contain one or more entries 620 that create registry value entries containing the signature 270 specified in the signature rule 245.

Signature rules 245 are stored in the identification table 310A. The process begins in step 910, where the identification table 310A is queried to find all rows having a Signature entry. In step 920, the digital signature 270 is extracted from the row. The signature rule 245 will be stored in the registry 195 in a new sub-key under "HKLM\Software\Policies\Microsoft\Windows\Safer\0\Hashes." Therefore, in step 930, a unique id is generated and is combined with this HKLM prefix to form the name of the new sub-key 545. In step 940, a section header 650 containing the name of this new sub-key is added to the script file 170. In step 950, new entries are added to the script file 170, under the newly-added section header 650. One entry contains the signature type, which may be extracted from the matching row in the identification table 314B. Another entry contains the size of the executable program 210, which may be computed on the fly. Yet another entry contains the signature 270, as extracted from the identification table 310B.

At step 960, the process determines whether or not more matching rows remain to be processed. If Yes, steps 915-930 are repeated until rows returned by the query have been processed. If No, the process terminates.

FIG. 10 illustrates the process of writing certificate rules, shown in FIG. 7 as step 750. This process will add a section to the script file 170 for each certificate rule 250 found in the detection table 310B. The new certificate rule section 660 will contain a header that creates, in the registry 195, a certificate rule sub-key 575. The new certificate rule section 660 will also contain one or more entries that create registry value entries (580, 590) containing the certificate 295 specified in the certificate rule 250.

Certificate rules 250 are stored in the detection table 310B. The process begins in step 1010, where the detection table 310B is queried to find all rows having a Certificate entry. In step 1020, the certificate 295 is extracted from the row. The certificate rule 250 will be stored in the registry 195 in a new subkey 575 under "HKLM\Software\Policies\Microsoft\SystemCertificates\My." In step 1030, a section header 660 containing the name of this new sub-key 575 is added to the script file 170. In step 1040, new entries are added to the script file 170, under the newly-added section header 660. One entry contains the certificate type, which may be extracted from the matching row in the detection table 310B. Another entry contains the certificate data, as extracted from the detection table 310B.

At step 1030, the process determines whether or not more matching rows remain to be processed. If Yes, steps 1015-1025 are repeated until rows returned by the query have been processed. If No, the process terminates.

Figure 11:
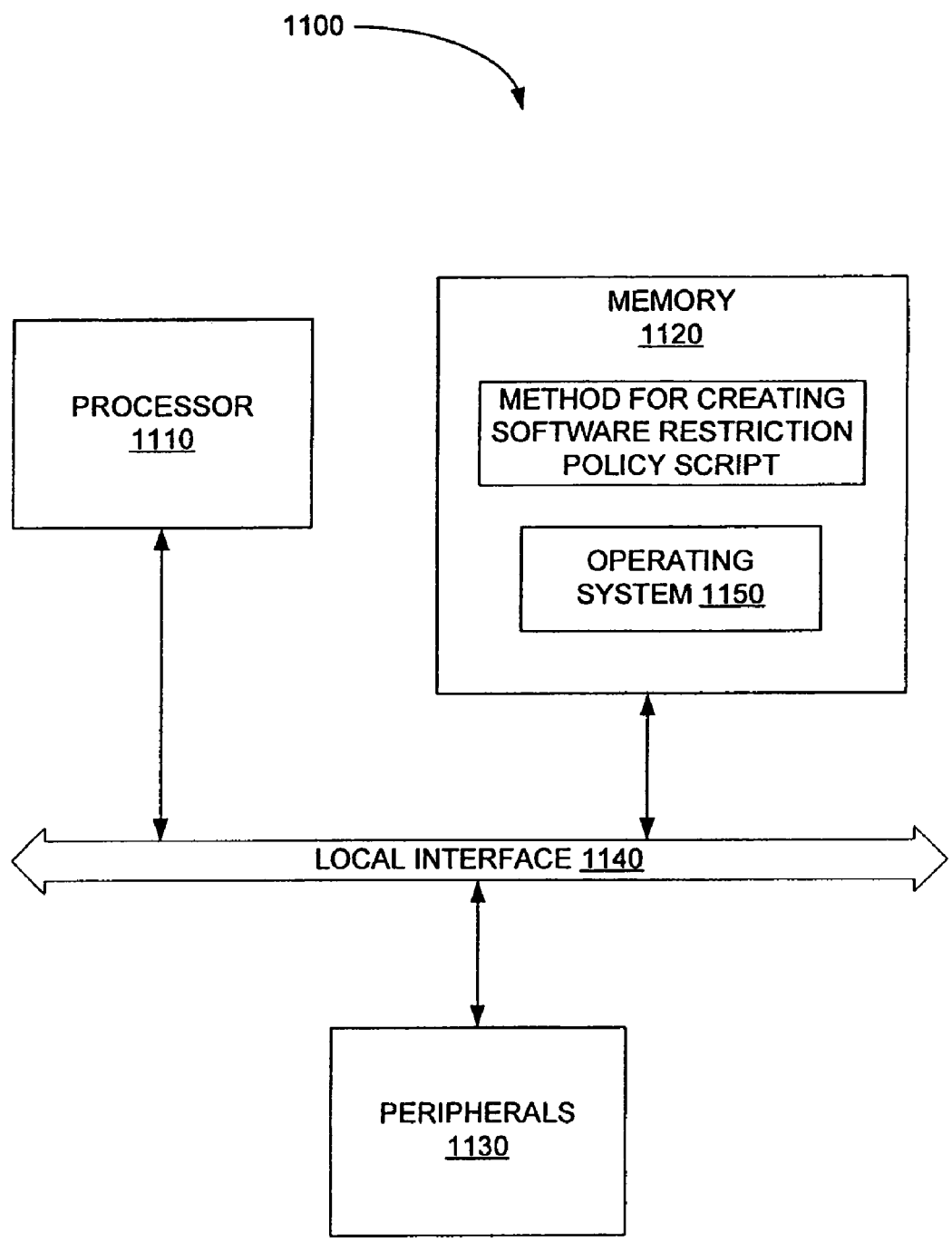
FIG. 11 is a block diagram of a general-purpose computer that can be used to implement the method for automating the creation of script including inoculation data.

FIG. 11 is a block diagram of a general purpose computer which can be used to implement the functionality of generator software 160. Generally, in terms of hardware architecture, the computer 1100 includes a processor 1110, memory 1120, and one or more input or output (UO) devices or peripherals 1130 that are communicatively coupled via a local interface 1140. The local interface 1140 can be, for example but not limited to, one or more buses or other wired or wireless connections, as is known in the art. The local interface 1140 may have additional elements (omitted for simplicity), such as controllers, buffers, drivers, repeaters, and receivers, to enable communications. Further, the local interface 1140 may include address, control, and data connections to enable appropriate communications among the aforementioned components.

The processor 1110 is a hardware device for executing software, particularly that stored in memory 1120. The processor 1110 can be any custom made or commercially available processor, a central processing unit (CPU), an auxiliary processor among several processors associated with the computer 1100, a semiconductor based microprocessor (in the form of a microchip or chip set), a microprocessor, or generally any device for executing software instructions.

The memory 1120 can include anyone or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1120 may incorporate electronic, magnetic, optical, or other types of storage media. Note that the memory 1120 can have a distributed architecture, where various components are situated remote from one another, but can be accessed by the processor 1110.

The software in the memory 1120 may include one or more separate programs, each of which comprises an ordered listing of executable instructions for implementing logical functions. In this example embodiment, the software in the memory 1120 includes one or more components of the system for communicating abnormal medical findings, and a suitable operating system 1150. The operating system 1150 essentially controls the execution of other computer programs and provides scheduling, input-output control, file and data management, memory management, and communication control and related services, the operating system 1150 may be any operating system, including, but not limited to, Unix, Linux, Windows®, AppleOS, etc.

The method for automating the creation of scripts including inoculation data is a source program, executable program (object code), script, or any other entity comprising a set of instructions to be performed. When a source program, then the program needs to be translated via a compiler, assembler, interpreter, or the like, which may or may not be included within the memory 1120, so as to operate properly in connection with the operating system 1150.

The peripherals 1130 may include input devices, for example but not limited to, a keyboard, mouse, etc. Furthermore, the peripherals 1130 may also include output devices, for example but not limited to, a printer, display, facsimile device, etc. Finally, the peripherals 1130 may further include devices that communicate both inputs and outputs, for instance but not limited to, a modulator/demodulator (modem; for accessing another device, system, or network), a radio frequency (RF) or other transceiver, and a network interface adapted to communicate data over wired and/or wireless communication networks with one or more other computers or other information processing devices.

If the computer 1100 is a personal computer, workstation, or the like, the software in the memory 1120 may further include a basic input output system (BIOS). The BIOS is a set of essential software routines that initialize and test hardware at startup, start the operating system 1150, and support the transfer of data among the hardware devices. The BIOS is stored in the ROM so that the BIOS can be executed when the computer 1100 is activated.

When computer 1100 is in operation, the processor 1110 is configured to execute software stored within the memory 1120, to communicate data to and from the memory 1120, and to generally control operations of the computer 1100 in accordance with the software.

It should be noted that the method for automating the creation of scripts including inoculation data can be stored on any computer readable medium for use by or in connection with any computer related system or method. In the context of this document, a "computer-readable medium" can be any means that can store, communicate, propagate, or transport the program for use by or in connection with the instruction execution system, system, or device. The computer-readable medium can be, for example but not limited to, an electronic, magnetic, optical, electromagnetic, infrared, or semiconductor system, system, device, or propagation medium. A non-exhaustive example set of the computer-readable medium would include the following: an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the method for automating the creation of scripts including inoculation data is implemented in hardware, it can be implemented with any or a combination of the following technologies, which are each well known in the art: a discrete logic circuit(s) having logic gates for implementing logic functions upon data signals, an application specific integrated circuit(s) (ASIC) having appropriate combinatorial logic gates, a programmable gate array(s) (PGA), a field programmable gate array(s) (FPGA), etc.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen, and described to illustrate the principles of the invention and its practical application to thereby enable one of ordinary skill in the art to utilize the invention in various embodiments and with various modifications for a variety of uses. Such modifications and variations are within the scope of the invention as determined by the appended claims when interpreted in accordance with the breadth to which they are fairly and legally entitled.

What is claimed is:

1. A computer-implemented method for automating creation of a script for use with a managed computer system, the method comprising:
   storing a set of descriptions of unauthorized software applications in a database accessible to one or more computer systems, a description of an unauthorized software application including one or more items that uniquely identify the unauthorized software application or that describe a behavior of the unauthorized software application when it executes;
   retrieving, with one or more processors associated with the one or more computer systems, at least one description of an unauthorized software application from the database in response to querying the database for at least one of a location, a signature, and a certificate;
   creating, with the one or more processors associated with the one or more computer systems, an introductory section in a script that causes security components of managed computer systems to apply software restrictions to software applications, the introductory section in the script specifying that the script is formatted to be directly usable by registry utilities natively provided by the operating system of the managed computer systems to configure the security components;
   generating, with the one or more processors associated with the one or more computer systems, a set of rules that block execution of the unauthorized software application on the managed computer system when characteristics of the unauthorized software application match items from the at least one description of the unauthorized software application incorporated into one or more rules in the set of rules;
   determining whether to create, with the one or more processors associated with the one or more computer systems, a first type of entry in the script based on the set of rules, the first type of entry corresponding to a security component setting on the managed computer system, adapted to control execution privileges of unauthorized software applications on the managed computer system when characteristics of the unauthorized software applications match one or more path rules in the set of rules;
   determining whether to create, with the one or more processors associated with the one or more computer systems, a second type of entry in the script based on the set of rules, the second type of entry corresponding to a security component setting on the managed computer system adapted to control execution privileges of unauthorized software applications on the managed computer system when characteristics of the unauthorized software applications match one or more signature rules in the set of rules;
   determining whether to create, with the one or more processors associated with the one or more computer systems, a third type of entry in the script based on the set of rules, the third type of entry corresponding to a security component setting on the managed computer system adapted to control execution privileges of unauthorized software applications on the managed computer system when characteristics of the unauthorized software applications match one or more certificate rules in the set of rules; and
   storing the script in a storage device associated with the one or more computer systems, wherein the stored script includes at least one of the first, second, and third type of entry.

2. The method of claim 1, wherein the script is utilized by the registry utility of the managed computer system to configure a security component of the managed computer system to deny execution privileges to the unauthorized software application when characteristics of the unauthorized software application when invoked match one or more rules in the set of rule.

3. The method of claim 1, wherein the script is utilized by the registry utility of the managed computer system to configure a security component of the managed computer system to grant execution privileges to an authorized software application.

4. The method of claim 1, further comprising the step of:
   distributing the script to the managed computer system over a network via a management protocol.

5. The method of claim 1, further comprising the step of:
   executing, with a processor associated with a management computer system, a system administrator utility program to distribute the script to the managed computer system.

6. The method of claim 1, wherein the one or more path rules identify the unauthorized software application by a filename.

7. The method of claim 1, wherein the one or more path rules identify the unauthorized software application by a storage path.

8. The method of claim 1, wherein the one or more path rules identify the unauthorized software application by an associated registry key.

9. The method of claim 1, wherein the one or more signature rules identify the unauthorized software application by a digital signature.

10. The method of claim 1, wherein one or more items in the at least one description of the unauthorized software application identify the unauthorized software application by a network location from which the unauthorized software application is downloaded.

11. The method of claim 1, wherein the one or more items in the at least one description of the unauthorized software application identify the unauthorized software application by a residual.

12. The method of claim 1, wherein the one or more items in the at least one description of the unauthorized software application identify the unauthorized software application by an ActiveX class identification.

13. A non-transitory computer-readable storage medium storing computer-executable code for automating creation of a script for use with a managed computer system, the computer-readable storage medium comprising:
   code for storing a set of descriptions of unauthorized software applications in a database, a description of an unauthorized software application including one or more items that uniquely identify the unauthorized software application or that describe a behavior of the unauthorized software application when it executes;
   code for retrieving at least one description of an unauthorized software application from the database in response to querying the database for at least one of a location, a signature, and a certificate;
   code for creating an introductory section in a script that causes security components of managed computer systems to apply software restrictions to software applications, the introductory section in the script specifying that the script is formatted to be directly usable by a registry utility natively provided by the operating system of the managed computer system;

code for generating a set of rules that block execution of the unauthorized software application on the managed computer system when characteristics of the unauthorized software application match items from the at least one description of the unauthorized software application incorporated into one or more rules in the set of rules;

code for determining whether to create a first type of entry in the script based on the set of rules, the first type of entry corresponding to a security component setting on the managed computer system adapted to control execution privileges of unauthorized software applications on the managed computer system when characteristics of the unauthorized software applications match one or more path rules in the set of rules;

code for determining whether to create a second type of entry in the script based on the set of rules, the second type of entry corresponding to a second security component setting on the managed computer system adapted to control execution privileges of unauthorized software applications on the managed computer system when characteristics of the unauthorized software applications match one or more signature rules in the set of rules;

code for determining whether to create a third type of entry in the script based on the set of rules, the third type of entry corresponding to a third security component setting on the managed computer system adapted to control execution privileges of unauthorized software applications on the managed computer system when characteristics of the unauthorized software applications match one or more certificate rules in the set of rules; and code for storing the script in a storage device.

14. The computer-readable storage medium of claim 13, wherein the script is utilized by the registry utility of the managed computer system to configure a security component of the managed computer system to deny execution privileges to the unauthorized software application when characteristics of the unauthorized software application when invoked match one or more rules in the set of rule.

15. The computer-readable storage medium of claim 13, wherein the script is utilized by the registry utility of the managed computer system to configure a security component of the managed computer system to grant execution privileges to an authorized software application.

16. The computer-readable storage medium of claim 13, further comprising:
code for distributing the script to the managed computer system over a network via a management protocol.

17. The computer-readable storage medium of claim 13, further comprising:
code for executing a system administrator utility program to distribute the script to the managed computer system.

18. The computer-readable storage medium of claim 13, wherein the one or more path rules identify the unauthorized software application by a filename.

19. The computer-readable storage medium of claim 13, wherein the one or more path rules identify the unauthorized software application by a storage path.

20. The computer-readable storage medium of claim 13, wherein the one or more path rules identify the unauthorized software application by an associated registry key.

21. The computer-readable storage medium of claim 13, wherein the one or more signature rules identify the unauthorized software application by a digital signature.

22. The computer-readable storage medium of claim 13, wherein one or more items in the at least one description of the unauthorized software application identify the unauthorized software application by a network location from which the unauthorized software application is downloaded.

23. The computer-readable storage medium of claim 13, wherein the one or more items in the at least one description of the unauthorized software application identify the unauthorized software application by a residual.

24. The computer-readable storage medium of claim 13, wherein the one or more items in the at least one description of the unauthorized software application identify the unauthorized software application by an ActiveX class identification.

* * * * *